United States Patent [19]
Hufton

[11] 3,971,643
[45] July 27, 1976

[54] VACUUM CLEANER INCLUDING DUST BAG AND FILTER

[75] Inventor: Austen B. Hufton, Glen Ellyn, Ill.

[73] Assignee: Service Master Industries, Inc., Downers Grove, Ill.

[22] Filed: Mar. 31, 1975

[21] Appl. No.: 563,505

[52] U.S. Cl. .................................. 55/372; 15/351; 55/380; 55/473; 55/481; 55/511; 55/527
[51] Int. Cl.² ................................................ B01D 46/02
[58] Field of Search ............................ 55/361–381, 55/511, 481, 473, 527, 514; 15/327 D, 350, 351

[56] References Cited
UNITED STATES PATENTS

| | | | |
|---|---|---|---|
| 1,422,105 | 7/1922 | Kirby | 55/367 |
| 1,828,584 | 10/1931 | Andersen | 55/364 |
| 1,999,826 | 4/1935 | Snell | 55/364 |
| 3,408,438 | 10/1968 | Staunton | 55/502 |
| 3,535,855 | 10/1970 | Howard et al. | 55/368 |

*Primary Examiner*—Bernard Nozick
*Attorney, Agent, or Firm*—Allegretti, Newitt, Witcoff & McAndrews

[57] ABSTRACT

The improved dust bag is designed for use with an upright vacuum cleaner and is made of air impervious material. The lower end of the dust bag is connected with the base of the upright vacuum cleaner adjacent to the air discharge outlet of the vacuum cleaner. A first, relatively large opening is formed in the dust bag and defines the flow path through which air may flow out of the dust bag. An inner wall divides the interior of the dust bag into first and second compartments and includes a second opening which is aligned with and coincides, in size and shape, with the first opening and which permits air to flow from the second compartment to the first compartment. A filter is disposed in the first compartment adjacent to the first opening and is utilized to filter the air as it flows out of the dust bag through the first opening. The pressure of the air within the second compartment of the dust bag biases the portion of the inner wall surrounding the second opening against the filter so as to form a seal therebetween. A second, inner dirt collection bag is disposed within the second compartment, is connected to the discharge opening of the upright vacuum cleaner, and is made of air pervious material.

The dust bag has normally closed apertures therein which permit selective replacement of the second bag and the filter. These apertures are closed by zipper type fasteners which prevent air from flowing out of the dust bag when the apertures are closed.

9 Claims, 6 Drawing Figures

VACUUM CLEANER INCLUDING DUST BAG AND FILTER

BACKGROUND AND SUMMARY OF THE INVENTION

The present invention relates to dust bags for vacuum cleaners, and more particularly, to improved dust bags for upright vacuum cleaners used in health care facilities.

It has long been recognized that upright vacuum cleaners have superior cleaning characteristics as compared to canister type vacuum cleaners. However, upright vacuum cleaners have a disadvantage, as compared to canister type vacuum cleaners, in that the air emitted from upright vacuum cleaners is not filtered as efficiently as the air emitted from canister type vacuum cleaners. This disadvantage is particularly significant when the vacuum cleaners are utilized to clean hospitals and other health care facilities where it is very important to minimize the amount of dirt, dust and the like entrained in the air emitted from the vacuum cleaner.

As a result of their design, upright vacuum cleaners utilize a generally vertically disposed dirt collection or dust bag which has its lower end connected with the air discharge outlet of a motor driven fan mounted in the base of the vacuum cleaner and which has its upper end connected to and carried by the handle of the vacuum cleaner. The motor driven fan in the base of the vacuum cleaner forces air under pressure into the dust bag, and dust and dirt from the surface being cleaned is entrained in this air. The dust bag functions to "trap" or filter as much of this entrained dust and dirt as possible from the air before the air is emitted from the bag.

When originally introduced to the market, many of the upright vacuum cleaners used cloth or fabric dirt collection bags. Such bags were air pervious and the air introduced into the bag through the discharge outlet of the vacuum cleaner was forced out through the cloth or fabric. By its very nature, the cloth or fabric acted as a relatively good filter for the air passing therethrough. However, after usage, dirt and dust would become "trapped" in the cloth or fabric. This would increase the resistance to air passing through the cloth or fabric and, consequently, would reduce the cleaning efficiency of the vacuum cleaner. In addition, the cloth or fabric bags were difficult to clean, and because of their cost, it was not practical to replace rather than clean them.

To avoid the disadvantages of the cloth or fabric bags, it has become common practice to utilize an inner paper dirt collection bag disposed within a plastic outer bag. The lower end of the paper is connected directly to air discharge outlet of the vacuum cleaner so that the air from the motor driven fan is initially forced into the paper bag. The air flows out of the paper bag through the paper and then flows out of the plastic outer bag. The plastic used to make the outer bag is air pervious and frequently has a plurality of small holes therein to facilitate the air flow. Thus, for all practical purposes, the air emitted from the vacuum cleaner is only filtered as it passes through the inner paper bag.

This paper inner bag - plastic outer bag combination is attractive from a marketing standpoint, because the inner paper bags are relatively inexpensive to replace and when necessary, the plastic outer bag can be easily cleaned. However, the air filtering efficiency of this combination of bags is not as good as that afforded by cloth or fabric bags, and is particularly disadvantageous when the vacuum cleaner is utilized to clean hospitals, health care facilities and the like wherein the dirt and dust free environment is required and wherein the dust and dirt "picked up" in one room should not be spread throughout other rooms.

It is a primary object of my present invention to provide an improved dust bag which affords a significantly higher air filtering efficiency than prior dust bag and which consequently, is particularly adapted for use with upright vacuum cleaners utilized to clean hospitals, health care facilities and the like. More specifically, my improved dust bag includes an inner paper bag directly connected to the air discharge outlet of a vacuum cleaner and an outer bag made of air impervious material.

The outer bag has a relatively large opening therein which defines the flow path for the air flowing out from the interior of the bag. An inner wall divides the outer bag into two compartments and includes a second opening which is aligned with and which coincides, in size and shape, with the first opening. The inner paper bag is disposed in the compartment remote from the first opening, and a high efficiency air filter is disposed in the compartment adjacent to the first opening. The portion of the inner wall surrounding the second opening is biased against the filter so as to form an air seal therebetween thus assuring that the air flowing out of my improved dust bag passes through the filter.

The outer bag also includes two normally closed apertures which, when opened, permit facile replacement of the filter and the inner paper bag. Zipper type fasteners are used to close these two apertures and prevent air from escaping through these apertures when they are closed.

The filter includes filtering material supported about its periphery by a frame. The frame may have a generally rectangular shape or may be wedge shaped. When a wedge shaped filter is utilized, the compartment into which the filter is dispoed has a corresponding wedge shape so that the filter can be tightly fit within the compartment. An open mesh material extends over the first and second openings to constrain and support the filter material.

These and other objects of the present invention will become apparent from the following description of the preferred embodiment of my improved dust bag which is described in connection with the accompanying drawings.

Figure 1:
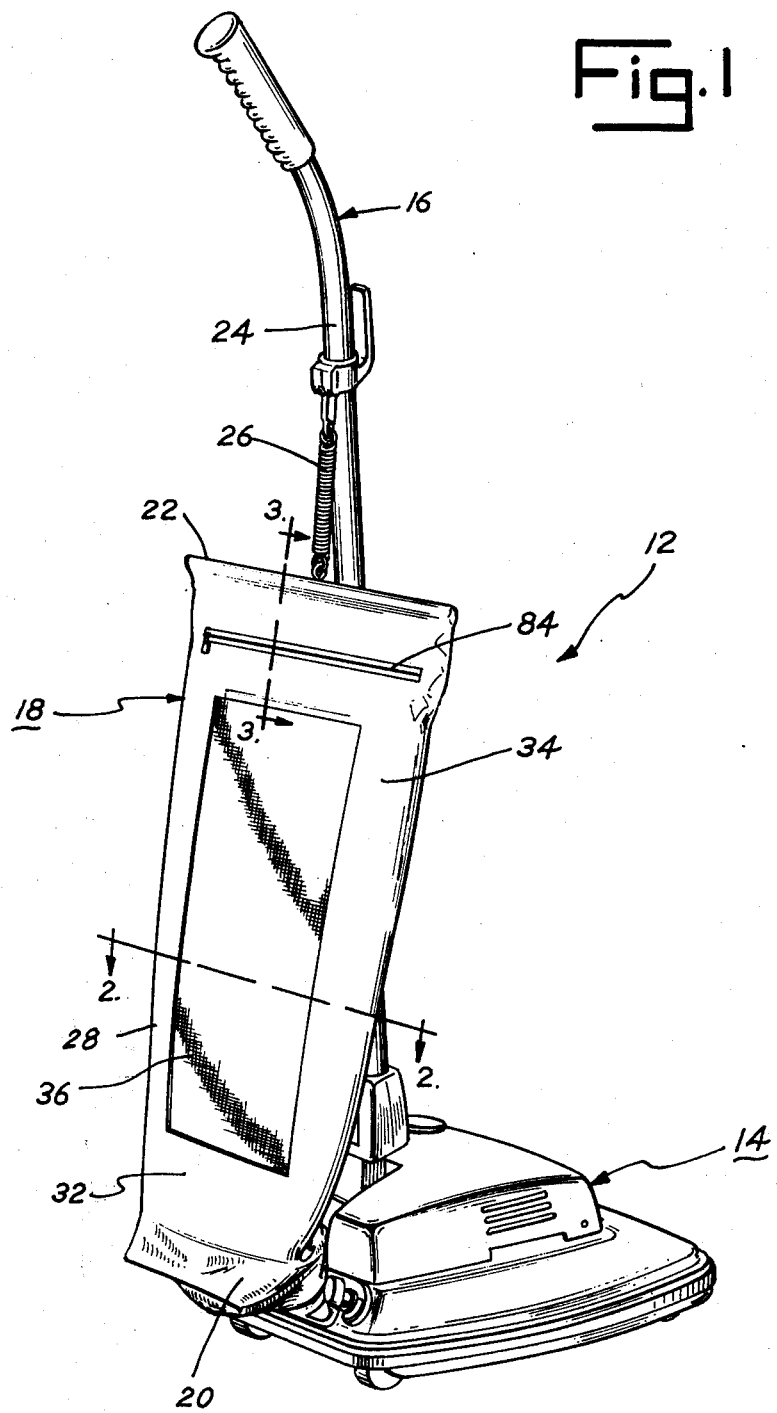
FIG. 1 is a perspective view of a vacuum cleaner utilizing an improved dust bag of my present invention.

Throughout the various figures of the drawings, the same reference numerals will be used to designate the same parts or components. Moreover, when the terms "right", "left", "upper", "lower", "front", "rear", "top" and "bottom" are used herein, it should be understood that these terms have reference to the structure shown in the drawings as it would appear to a person viewing the drawings,

DESCRIPTION OF THE PREFERRED EMBODIMENT

Referring now to FIG. 1, a conventional upright vacuum cleaner is shown generally at 12 and comprises base 14 and a generally vertically disposed handle 16. The base 14 includes rollers or other means, not shown, for facilitating the movement of the vacuum cleaner 12 over the surface to be cleaned and a motor driven fan, not shown, which provides the "vacuum" utilized to "pick up" or "suck up" dirt, dust and the like on the surface. The handle 16 is mounted on the base 14 so that it may be selectively pivoted, with respect to the base 14, in the conventional manner.

A dust bag, embodying the principles of my invention, is shown generally at 18 and is mounted on the upright vacuum cleaner 12. As will be described in more detail hereinafter, the open lower end 20 of the dust bag 18 is connected with the base so that the air being discharged from the motor driven fan is directed into the interior of the dust bag 18. The upper end 22 of the dust bag 18 is connected to the upper portion 24 of the handle 16 by a spring 26 so as to permit the upper end 22 of the bag 18 to move relatively with respect to the handle 16. More specifically, and as best shown in FIG. 3, the lower end of the spring 26 is fastened about the central portion of a wooden dowel 29 which extends transversely across the upper end 22 of the bag 18.

Figure 2:
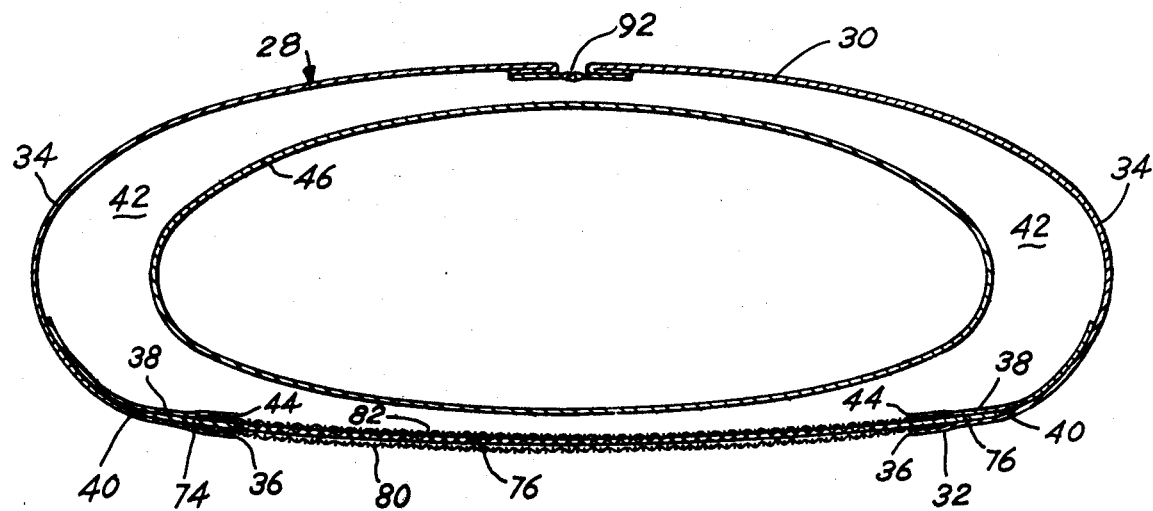
FIG. 2 is a cross-sectional view taken along line 2 — 2 in FIG. 1.
Figure 3:
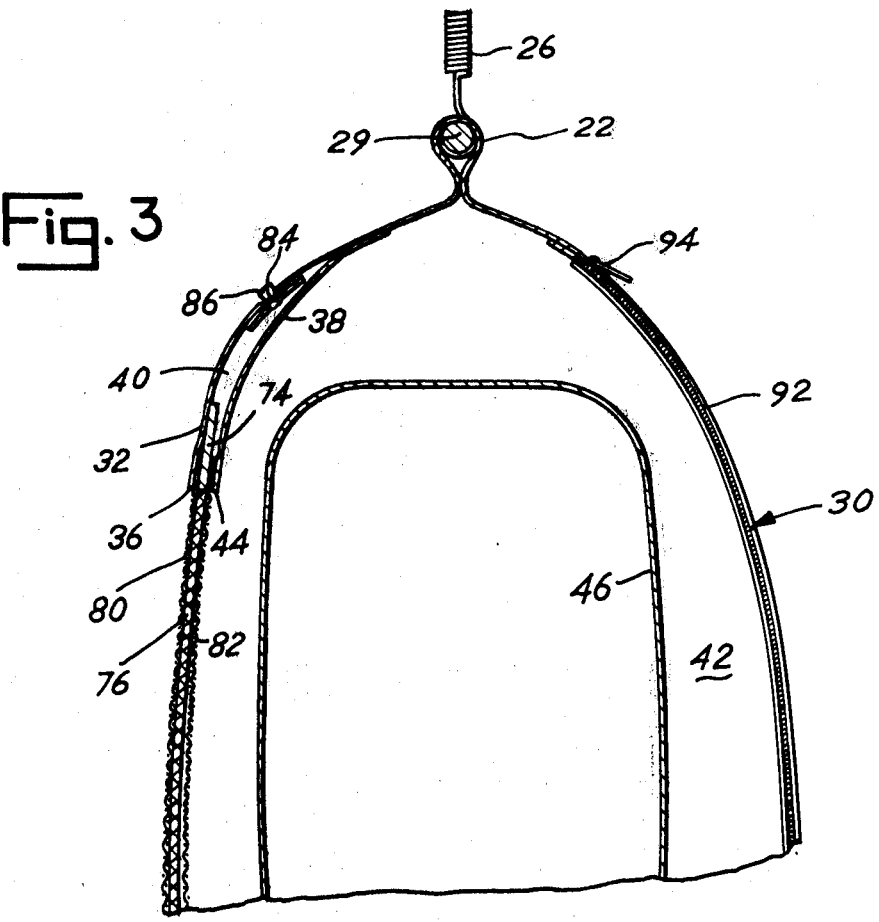
FIG. 3 is a partial cross-sectional view taken along the line 3 — 3 in FIG. 1.

Referring now to FIGS. 1 - 3, the dust bag 18 comprises an elongated, generally closed outer body 28 having a front portion 30, a rear portion 32, and side portions 34. The body 28 is made from an air impervious material such as, for example, an air impervious vinyl material. The edges and ends of these portions 30, 32 and 34 are interconnected by stitching or heat sealing so as to form air-tight seams therebetween.

A centrally disposed, generally rectangular opening 36 is formed in the rear portion 32 of the body 28. The opening 36 is relatively large, having an area approximately equal to one-half the area of the rear portion 32, and defines the sole path by which air in the dust bag 18 can flow or "escape" from the interior of the bag. For the most efficient filtration and as described hereinafter, it is important that the opening 36 be of a sufficiently large area to permit air flow therethrough at as low a efm (volocity)as possible.

An inner wall 38 divides the interior of the body 28 in a first compartment 40 and a much larger second compartment. The wall 38 corresponds generally in size and shape to the rear portion 32 of the body 28, and its edges or ends are attached to the body 28 by stitching or heat sealing so that air may not flow between the ends of the wall 38 and the body 28. A centrally disposed, generally rectangular opening 44 is formed in the wall 38 and defines the sole path by which air can flow from the second compartment 42 into the first compartment 40 and vice versa. The opening 44 is aligned with and is the same size and shape as the opening 26.

A conventional, paper dust bag 46 is disposed within a second compartment 42. The paper bag 46 is of conventional design and manufacture and is utilized to trap and retain the major portion of the dust and dirt picked up from the surface to be cleaned by the vacuum cleaner 12. In this regard, the paper utilized to make the bag 36 is air pervious although it does block the escape of the larger dust and dirt particles entrained in the air.

Figure 4:
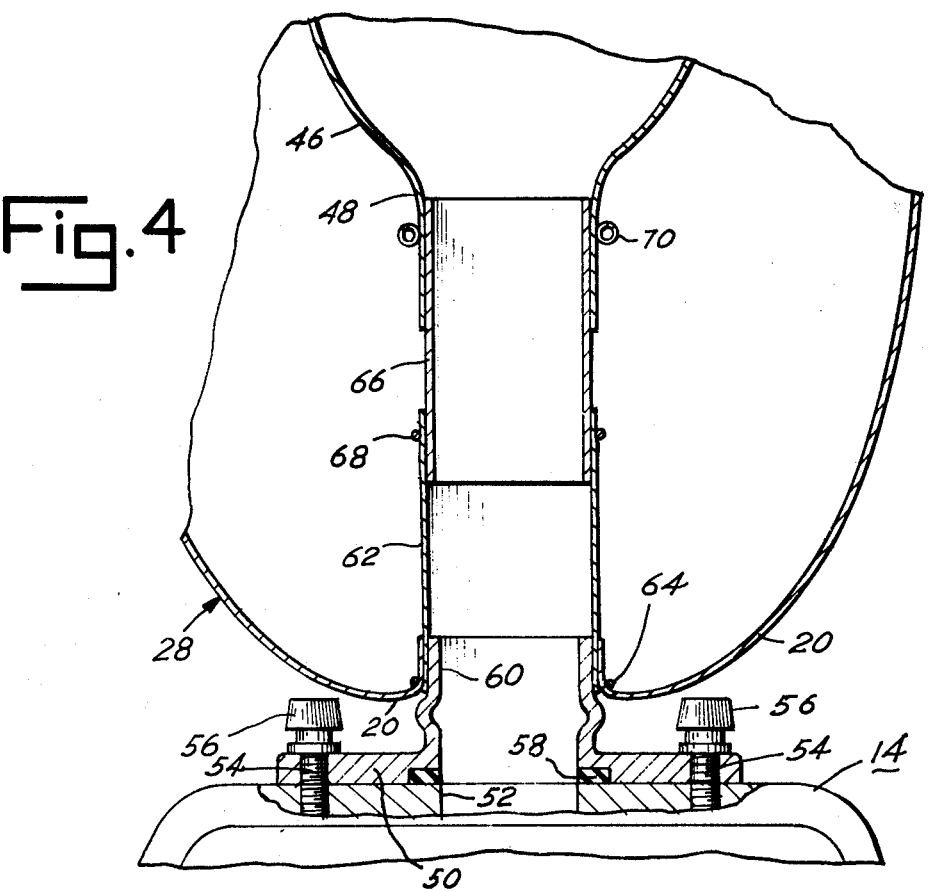
FIG. 4 is a partial cross-sectional view showing the discharge outlet of the vacuum cleaner of FIG. 1 and showing my improved dust bag connected thereto.

As best shown in FIG. 4, the open, lower end 48 of the paper bag 44, like the open, lower end 20 of the body 28, is connected to the base 14. More specifically, the lower ends 20 and 48 are attached to a bracket 50 which, in turn, is detachable mounted on the base 14. In this regard, the base 14 includes an air discharge outlet 52 which is in communication with the outlet of the motor driven fan in the base 14 and through which air is normally discharged at a rate of 40–60 cfm. Two threaded studs 54 project from the base 14 adjacent to the outlet 52 and portions of the bracket 50 are adapted to fit around these studs. Nuts or wing nuts 56 are threaded on the studs 54 and tightly clamp the bracket 50 to the base 14. A sealing ring 58 prevents air from escaping from between the bracket 50 and the base 14.

The bracket 50 includes an integral, tubular neck 60 which is the same size and shape as the air discharge opening 52, which is coaxial with the air discharge opening 52 and which defines a path of flow for the air flowing out of the air discharge outlet 52. The lower, distal end 20 of the body 28 and one end of a flexible sleeve 62 are disposed about and tightly clamped to the neck 60 by a wire 64 which encircles the neck 60. The sleeve 62 is made of an air impervious fabric. The other end of the sleeve 62 is disposed about and tightly clamped to one end of a rigid sleeve 66 by a wire 68. The lower distal end 48 of the paper bag 46 is disposed about and tightly clamped to the other end of the rigid sleeve 66 by a coil spring 70. The use of the spring 70 facilitates replacement of the bag 46. The spring 70 need only be moved or "rolled" toward the wire 68 on the rigid sleeve 66 and then an "old" bag can be removed from and "new" bag slipped over the other end of the sleeve 66.

The neck 60 and sleeves 62 and 66 define a flowpath for the air being emitted, under pressure, from the air discharge outlet 52 and direct the air into the interior of the paper bag 46. Because of the wires 64 and 68 and the spring 70, air cannot escape or leak from this flow path. Dirt, dust and the like may be entrained in this air flow, and this dirt and dust is, thus, introduced into the interior of the paper bag 46. The major portion of this dirt, dust and the like is entrapped or retained in the bag 46 when the air flows out of the bag 46 through the paper walls of the bag 46. However, some of the smaller particles of the dust and dirt also pass through the paper walls of the bag 46. In prior dust bags, these smaller dust and dirt particles passed out of the dust bag and into the room where the vacuum cleaner 12 was located.

Figure 5:
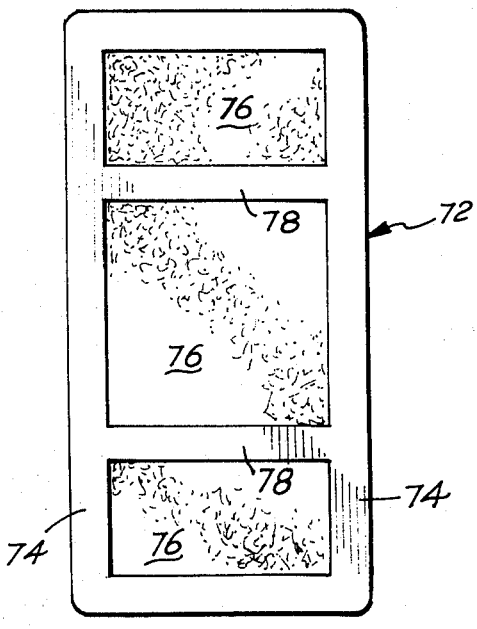
FIG. 5 is a plan view of a filter which may be utilized with the improved dust bag of the present invention.
Figure 6:
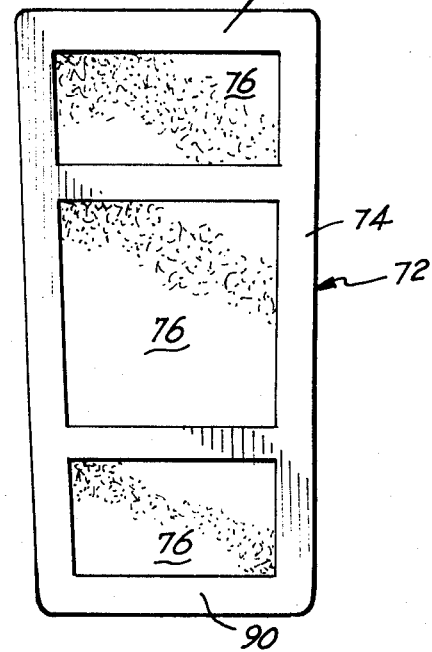
FIG. 6 is a plan view of an alternate design of a filter which may be utilized with the improved dust bag of the present invention.

To prevent this, my improved dust bag 18 includes a highly efficient air filter 72. As best shown in FIGS. 5 and 6, the filter 72 has a generally rectangular shape and is generally the same size and shape as the rear portion 32 of the body 28. The filter 72 comprises a frame 74 and a mat 76 of filter media, such as a very fine diameter (.00003'') fiber glass felt which has an average efficiency of 95% (atmospheric dust filtration efficiency as determined by ASHRAE Standard 52-62 or NBS Dust Stop Method) and which is marketed by Johns-Manville under the trade designation "AF-3". The frame 74 engages the peripheral edges of the mat 76 and supports the mat. The frame 74 includes two transverse members 78 which add strength and rigidity to the filter 72.

The filter 72 is disposed in the first compartment 40 so that the filter mat 76 is aligned with the openings 36 and 44. The shape of the filter mat 76 is congruent to the shape of the openings 36 and 44, and the size of the mat 76 is slightly greater than the size of the opening 36 and 44 so that the mat 76 completely overlies the openings. The pressure of the air within the interior of the second compartment 42 biases the wall 38, and particularly that portion of the wall 38 surrounding the opening 44, against the filter frame 74 so as to form an air tight seal therebetween. This seal assures that all the air will flow through the filter and none will pass or leak into the first compartment 40 around the frame 74.

A piece of open mesh material 80 extends across the opening 36 and its edges are attached to the body 28. Similarly, another piece of open mesh material 82 extends across the opening 44 and its edges are attached to the wall 38. These pieces of material 80 and 82 serve to support and constrain the filter media 76. The size of the mesh is selected so as to offer minimal resistance to the air flowing through the openings 36 and 44, and in this regard, it may be desirable to have the size of mesh in piece 82 larger than the size of the mesh in piece 80.

To permit replacement of the filter 72, a transverse, normally closed aperture 84 is formed in the rear portion 32 of the body 28 adjacent to the upper end 22 of the bag 18. As seen in FIGS. 1 and 3, the aperture 84 extends across the upper end of the first compartment 40, and when open, permits access to the first compartment. An "old" filter 72 can be removed and a "new" filter 72 can be inserted into the first compartment 40 through the open aperture 84. A conventional, zipper type fastener 86 is utilized to close the aperture 84 and to prevent air from leaking through the aperture 84 when it is closed.

To facilitate insertion and removal of the filter 72 from the first compartment 40, the corners of the filter frame 74 may be rounded as shown in FIGS. 5 and 6. In addition, the filter 72 may have a wedge shape, i.e. the width of its upper end 88 is made slightly greater than the width of its lower end 90 as shown in FIG 6. When a wedge shape filter 72 is utilized, the first compartment 40 is made so that it has a corresponding wedge shape, i.e. the width of the upper end of the first compartment 40 is made slightly greater than the width of its lower end. Thus the congruent shapes of the wedge shaped filter 72 and first compartment 40 assure that the wedge shaped filter 72 will be retained securely within the first compartment 40.

To permit replacement of the paper bag 46, a vertically disposed, normally closed aperture 92 is formed in the front portion 30 of the body 28 as shown in FIGS. 2 and 3. The aperture 92 extends from adjacent to the upper end 22 of the bag 18 to adjacent to the lower end 20 of the bag and permits ready access to the interior of the second compartment 42. As noted above, the paper bag 46 can be replaced by the simple expedient of moving the spring 70 toward the one end of the sleeve 66 and pulling the lower end 48 of the "old" bag 46 off of the sleeve 66. The lower end 48 of a "new" bag 46 can then be slipped over the sleeve 66 and the spring 70 moved back so that it overlies the end 48.

A conventional, zipper type fastener 94, similar to the fastener 86, is utilized to close the aperture 92. The fastener 94 prevents air from leaking through the aperture 92 when it is closed.

In view of the foregoing, it should be apparent to those having skill in this art that my dust bag is novel and represents a substantial improvement over the dust bags heretofore available for use in hospitals, health care facilities and the like. While my dust bag is not expensive to manufacture, it provides a highly efficient filtration system. Tests performed with prototype models of my improved dust bag have shown that my dust bag has an overall air filtration efficiency of 50% as compared with an overall air filtration efficiency of 30% for conventional paper inner bags — air pervious plastic outer bag combinations.

It should also be obvious to those skilled in the art that changes or modifications could be made in my above described dust bag. For example, the transverse members 78 could be eliminated from the filter frame 74. Likewise, the opening 36 does not need to be located in the rear portion 32 of the body 28 but could obviously be located elsewhere. Similarly, the size and shape of the openings 36 and 44 could be varied so long as they are sufficiently large to disperse the air flow therethrough at as low a lfm (velocity) as possible so as to permit efficient filtration by the filter 72, and of course, are vertically disposed aperture extending along a side portion 34, could be used instead of the two aperture 84 and 92. Thus, since the invention described herein may be embodied in other specific forms without departing from the spirit or central characteristics thereof, the preferred embodiment described herein is therefore to be considered in all respects as illustrative and not restrictive, the scope of the invention being indicated by the appended claims, and all changes which come within the meaning and equivalency of the claims are therefore intended to be embraced therein.

I claim:

1. An improved dust bag for an upright vacuum cleaner that has a discharge opening through which air, including various sized entrained dust and dirt particles, flows under pressure and that is used to clean in hospitals and other health care facilities wherein it is important to minimize the dispersion of dust and dirt, the improved dust bag comprising:

inlet conduit means adapted to be connected with the discharge outlet of the upright vacuum cleaner so that air, including the entrained dust and dirt particles from the upright vacuum cleaner, is introduced into and flows through the inlet conduit means;

a generally closed, air pervious, first bag having an exterior wall made of air pervious material and including an inlet connected with the inlet conduit means so that air, including the entrained dust and dirt particles discharged from the upright vacuum cleaner, is introduced, under pressure, into the interior of the first bag, with the air, together with the smaller sized dust and dirt particles, then passing through the air pervious walls of the first bag; means for securing the inlet of the first bag to the inlet conduit means; a generally closed, air impervious, second bag having an exterior wall made of air impervious material and being disposed about the first bag so that the first bag is completely enclosed within the second bag, the lower end of the second bag having an inlet portion connected about the inlet conduit means so that air within the second bag cannot escape from the second bag between the inlet portion of the second bag and the inlet conduit means, the second bag having a relatively flexible, air impervious inner wall that has its marginal edges secured to the exterior wall of the second bag and extends across the interior of the second bag so that the inner wall, together with the exterior wall of the second bag, defines a first compartment and a second compartment within the second bag, with the first bag being disposed entirely within the second compartment; means for securing the inlet portion of the second bag to the inlet conduit means; a first, relatively large opening formed in the portion of the second bag exterior wall defining the first compartment; a second, relatively large opening formed in the inner wall of the second bag, with the second opening being aligned with the first opening and having a size and shape generally corresponding to the size and shape of the first opening and with the first and second openings constituting the path through which air from the first bag passes out of the second bag; a filter including a frame and a fiber glass felt filtering media, with the diameters of the fibers of the filtering media being in the range of 0.75 microns, the filtering media having a shape corresponding to the shape of the first opening and having a size greater than the size of the first opening, the filter frame being disposed and supported within the first compartment of the second bag so that the filtering media is disposed in the path through which air from the first bag passes out of the second bag and is in filtering communication with the air flowing through the first and second openings, so that all air passing through the first and second openings must pass through the filtering media and so that the small sized dust and dirt particles entrained in the air passing through the first and second openings are filtered out of the air with the air flowing through the first and second openings biasing the portions of the inner wall surrounding the second opening against the filter so as to form a seal between these inner wall portions and the filter so that the filter is clamped between the inner wall and the portion of the second bag exterior wall which defines the first compartment.

2. The improved dust bag described in claim 1 wherein means for constraining and supporting the filtering media extends across the first opening and the second opening; and wherein the constraining and supporting means includes an open mesh material.

3. The improved dust bag described in claim 1 wherein a first, normally closed aperture is formed in a portion of the exterior wall of the second bag that defines the second compartment; wherein the first aperture, when open, permits replacement of the first bag; and wherein the second bag includes means for closing the first aperture and for preventing air from passing through the first aperture when the first aperture is closed.

4. The improved dust bag described in claim 1 wherein a portion of the exterior wall of the second bag that defines the first compartment includes a second normally closed aperture; wherein the second aperture, when open, permits replacement of the filter; and wherein the second bag includes means for closing the second aperture and for preventing air from passing through the second aperture when the second aperture is closed.

5. The improved dust bag described in claim 1 wherein the filter frame has an upper end and a lower end and supports the filtering media about its peripheral edges.

6. The improved dust bag described in claim 5 wherein a portion of the exterior wall of the second bag that defines the first compartment includes a second, normally closed aperture which is adjacent to the upper end of the second body and which permits access to the first compartment; wherein the width of the first compartment, adjacent to the lower end of the second bag, is less than the width of the first compartment, adjacent to the upper end of the second bag; wherein the width of the lower end of the filter is less than the width of the upper end of the filter; and wherein the width of the upper end of the filter is comparable to the width of the upper end of the first compartment and the width of the lower end of the filter is comparable to the width of the lower end of the first compartment so that the filter may be wedged tightly within the first compartment.

7. The improved dust bag described in claim 6 wherein means for constraining and supporting the filtering media extends across the first opening and the second opening; and wherein the constraining and supporting means includes an open mesh material.

8. An improved upright vacuum cleaner used to clean hospitals and other health care facilities wherein it is important to minimize the dispersion of dust and dirt, the improved upright vacuum cleaner comprising:
a base adapted to be moved across a surface to be cleaned, the base including an air discharge opening and a motor driven fan that causes air, including various sized entrained dust and dirt particles, to flow out, under pressure, of the air discharge opening;
a generally vertically disposed handle having an upper end and a lower end which is pivotably mounted on the base; and
an improved dust bag including: inlet conduit means adapted to be connected with the discharge opening so that air, including the entrained dust and dirt particles from the discharge opening, air is introduced into and flows through the inlet conduit means; a generally closed, air pervious, first bag having an exterior wall made of air pervious material and including an inlet connected with the inlet conduit means so that air, including the entrained dust and dirt particles discharged from the air discharge outlet, is introduced, under pressure, into the interior of the first bag, with the air, together with the smaller sized dust and dirt particles, then passing through the air pervious walls of the first bag; means for securing the inlet of the first bag to the inlet conduit means; a generally closed, air impervious, second bag having an upper end and a lower end and an exterior wall made of air impervious material and being disposed about the first bag so that the first bag is completely enclosed within the second bag, the upper end of the second bag being connected with the upper end of the handle, the lower end of the second bag having an inlet portion connected about the inlet conduit means, the second bag having a relatively flexible, air impervious inner wall that has its marginal edges secured to the exterior wall of the second bag and extends across the interior of the second bag so that the inner wall, together with the exterior wall of the second bag, defines a first compartment and a second compartment within the second bag, with the first bag being disposed entirely within the second compartment; means for securing the inlet portion of the second bag to the inlet conduit means; a first, relatively large opening formed in the portion of the second bag exterior wall defining the first compartment; a second, relatively large opening formed in the inner wall of the second bag, with the second opening being aligned with the first opening and having a size and shape generally corresponding to the size and shape of the first opening and with the first and second openings constituting the path through which air from the first bag passes out of the second bag; a filter including a frame and a fiber glass felt filtering media, with the diameters of the fibers of the filtering media being in the range of 0.75 microns, the filtering media having a shape corresponding to the shape of the first opening and having a size greater than the size of the first opening, the filter frame being disposed and supported within the first compartment of the second bag so that the filtering media is disposed in the path through which air from the first bag passes out of the second bag and is in filtering communication with the air flowing through the first and second openings so that all air passing through the first and second openings must pass through the filtering media, and so that the small sized dust and dirt particles entrained in the air passing through the first and second openings are filtered out of the air, with the air flowing through the first and second openings biasing the portions of the inner wall surrounding the second opening against the filter so as to form a seal between these inner wall portions and the filter and so that the filter is clamped between the inner wall and the portion of the second bag wall which defines the first compartment.

9. The improved upright vacuum cleaner described in claim 8 wherein the filter has an upper end and a lower end; wherein a means for constraining and supporting the filtering media overlies the first opening and the second opening; wherein the constraining and supporting means includes an open mesh material; wherein a portion of the exterior wall of the second bag that defines the second compartment has a first normally closed aperture therein which permits access to the second compartment; wherein the first aperture, when open, permits replacement of the first bag; wherein the second bag includes means for closing the first aperture and for preventing air from passing through the first aperture when the first aperture is closed; wherein a portion of the exterior wall of the second bag that defines the first compartment includes a second, normally closed aperture which is adjacent to the upper end of the second bag and which permits access to the first compartment; wherein the width of the first compartment, adjacent to the lower end of the second bag, is less than the width of the first compartment, adjacent to the upper end of the second bag; wherein the width of the lower end of the filter is less than the width of the upper end of the filter; and wherein the width of the upper end of the filter is comparable to the width of the lower end of the filter so that the filter may be wedged tightly within the first compartment; and wherein the second aperture, when open, permits replacement of the filter; and wherein the second bag includes means for closing the second aperture and for preventing air from passing through the second aperture when the second aperture is closed.

* * * * *